US009906538B2

United States Patent
Zeitlin et al.

(10) Patent No.: US 9,906,538 B2
(45) Date of Patent: *Feb. 27, 2018

(54) AUTOMATIC NETWORK ATTACK DETECTION AND REMEDIATION USING INFORMATION COLLECTED BY HONEYPOTS

(71) Applicant: Guardicore Ltd., Tel Aviv (IL)

(72) Inventors: Ariel Zeitlin, Kfar Saba (IL); Lior Neudorfer, Tel Aviv (IL)

(73) Assignee: GUARDICORE LTD., Tel Aviv (IL)

( * ) Notice: Subject to any disclaimer, the term of this patent is extended or adjusted under 35 U.S.C. 154(b) by 93 days.

This patent is subject to a terminal disclaimer.

(21) Appl. No.: 14/953,446

(22) Filed: Nov. 30, 2015

(65) Prior Publication Data

US 2016/0164894 A1 Jun. 9, 2016

Related U.S. Application Data

(60) Provisional application No. 62/086,775, filed on Dec. 3, 2014.

(51) Int. Cl.
*H04L 29/06* (2006.01)
*H04L 29/08* (2006.01)

(52) U.S. Cl.
CPC ......... *H04L 63/1416* (2013.01); *H04L 63/12* (2013.01); *H04L 63/1408* (2013.01); *H04L 63/1491* (2013.01); *H04L 67/306* (2013.01)

(58) Field of Classification Search
CPC ............ H04L 63/1408; H04L 63/1491; H04L 63/1416; H04L 63/12; H04L 67/306
USPC ....................................................... 726/23
See application file for complete search history.

(56) References Cited

U.S. PATENT DOCUMENTS

| 7,107,347 | B1 | 9/2006 | Cohen | |
|---|---|---|---|---|
| 7,516,227 | B2 | 4/2009 | Cohen | |
| 2005/0174961 | A1* | 8/2005 | Hrastar | H04W 28/20 370/328 |
| 2009/0044277 | A1* | 2/2009 | Aaron | H04L 63/1433 726/25 |
| 2013/0298192 | A1* | 11/2013 | Kumar | G06F 21/52 726/3 |
| 2014/0259169 | A1* | 9/2014 | Harrison | G06F 21/554 726/23 |

OTHER PUBLICATIONS

VMware Inc., "VMware vCenter Server: Centrally Managed Virtual Infrastructure Delivered with Confidence", Datasheet, 2 pages, year 2015.

* cited by examiner

*Primary Examiner* — Hadi Armouche
*Assistant Examiner* — Sakinah Taylor
(74) *Attorney, Agent, or Firm* — D.Kligler IP Services Ltd.

(57) ABSTRACT

A method for securing a computer system includes detecting a malware attack on a honeypot node, and, based on the detected malware attack, automatically generating investigation directives for verifying whether an endpoint of the computer system is subject to the malware attack. The investigation directives are distributed to one or more software agents that are each associated with one or more endpoints of the computer system. At least one infected endpoint in the computer system, which is subject to the malware attack, is identified by the software agents using the investigation directives.

20 Claims, 2 Drawing Sheets

AUTOMATIC NETWORK ATTACK DETECTION AND REMEDIATION USING INFORMATION COLLECTED BY HONEYPOTS

CROSS-REFERENCE TO RELATED APPLICATIONS

This application claims the benefit of U.S. Provisional Patent Application 62/086,775, filed Dec. 3, 2014, whose disclosure is incorporated herein by reference.

FIELD OF THE INVENTION

The present invention relates generally to computer network security, and particularly to methods and systems for detection and remediation of network attacks.

SUMMARY OF THE INVENTION

An embodiment of the present invention that is described herein provides a method for securing a computer system. The method includes detecting a malware attack on a honeypot node, and, based on the detected malware attack, automatically generating investigation directives for verifying whether an endpoint of the computer system is subject to the malware attack. The investigation directives are distributed to one or more software agents that are each associated with one or more endpoints of the computer system. At least one infected endpoint in the computer system, which is subject to the malware attack, is identified by the software agents using the investigation directives.

In some embodiments, detecting the malware attack includes automatically generating one or more characteristics of the malware attack, by automatically distinguishing between legitimate accesses and hostile accesses to the honeypot node. Typically, detecting the malware attack, generating and distributing the investigation directives, and identifying the infected node are performed without human involvement.

In various embodiments, automatically generating the investigation directives includes automatically specifying at least one characteristic of the malware attack, selected from a group of characteristics consisting of: one or more processes installed on the honeypot node as part of the malware attack; one or more files uploaded to the honeypot node as part of the malware attack; one or more registry added or modified on the honeypot node as part of the malware attack; one or more user accounts added on the honeypot as part of the malware attack; one or more Command and Control (C&C) addresses or Uniform Resource Locators (URLs) accessed during the malware attack; and one or more backdoors created as part of the malware attack. In an embodiment, automatically specifying the files uploaded to the honeypot node includes specifying only the files that were uploaded to the honeypot node and then executed.

In some embodiments, automatically generating the investigation directives includes automatically specifying a type of endpoint that is targeted by the malware attack. In an example embodiment, distributing the investigation directives includes sending the investigation directives only to the software agents that are associated with at least one endpoint of the specified type. In another embodiment, distributing the investigation directives includes notifying a given software agent of the endpoints that are associated with the given software agent and are of the specified type. In yet another embodiment, specifying the type of endpoint includes specifying an Operating System (OS) type targeted by the malware attack.

In a disclosed embodiment, one or more of the endpoints include Virtual Machines (VMs), and identifying the infected endpoint includes examining a memory of one or more of the VMs using memory introspection. The method may further include, in response to identifying the infected endpoint, automatically quarantining the infected endpoint or a node of the computing system that hosts the infected endpoint. Additionally or alternatively, the method may include, in response to identifying the infected endpoint, automatically remediating the infected endpoint.

There is additionally provided, in accordance with an embodiment of the present invention, an apparatus for securing a computer system. The apparatus includes a honeypot node and one or more software agents. The honeypot node is configured to detect a malware attack thereon and to initiate, based on the detected malware attack, automatic generation of investigation directives for verifying whether an endpoint of the computer system is subject to the malware attack. The software agents are each associated with one or more endpoints of the computer system and configured to receive the investigation directives, and to identify, using the investigation directives, at least one infected endpoint in the computer system that is subject to the malware attack.

The present invention will be more fully understood from the following detailed description of the embodiments thereof, taken together with the drawings in which:

DETAILED DESCRIPTION OF EMBODIMENTS

Overview

Figure 1:
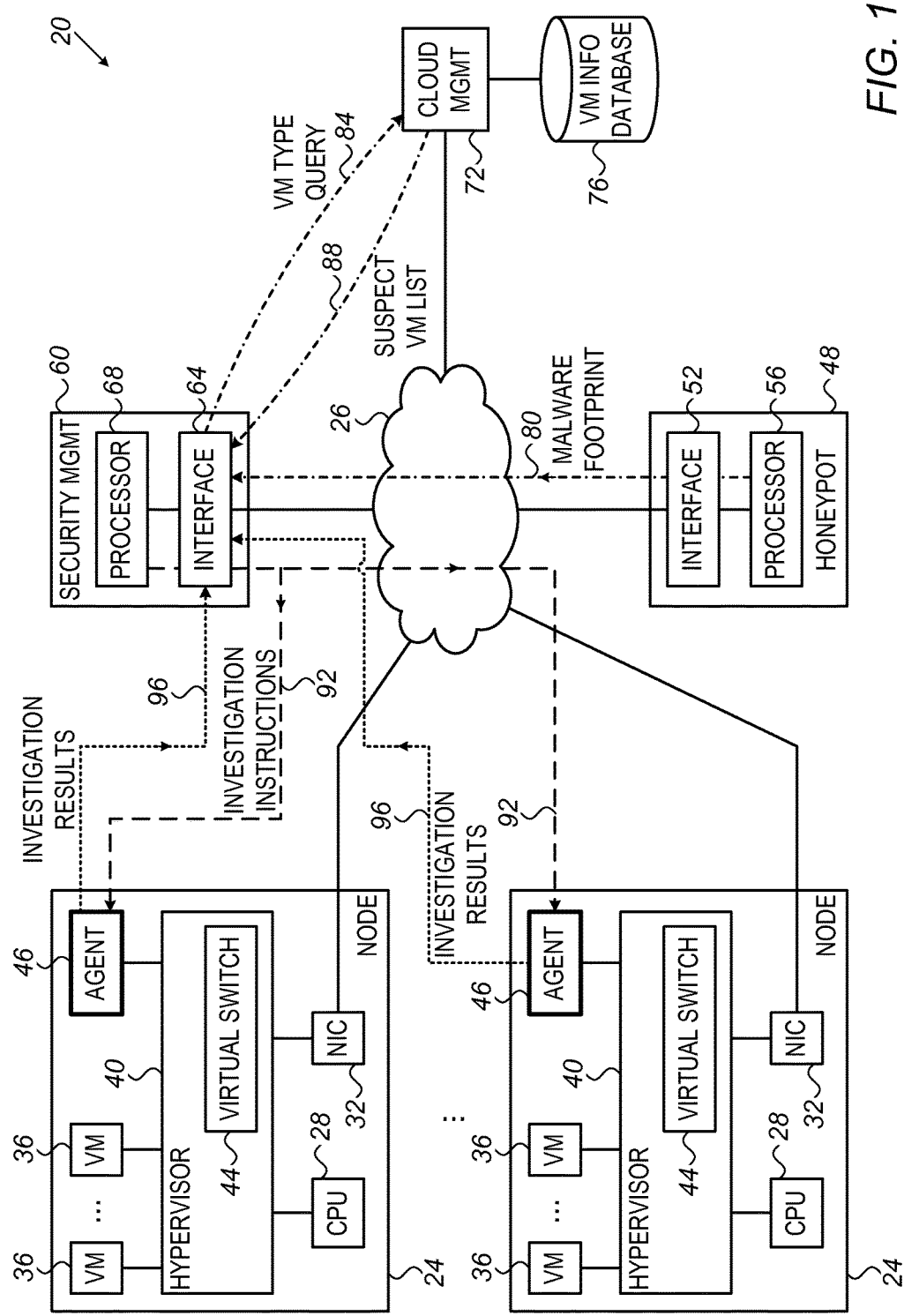
FIG. 1 is a block diagram that schematically illustrates a secure computer system, in accordance with an embodiment of the present invention.

Embodiments of the present invention that are described herein provide improved methods and systems for securing computer systems that comprise multiple endpoints, such as data centers. Endpoints may comprise either virtual or physical machines. In some embodiments, a security system comprises an intelligent honeypot node, and one or more software agents that are each coupled to one or more endpoints of the computer system.

The honeypot detects and analyze malware attacks thereon, and automatically generates investigation directives for use by the software agents. Each software agent verifies, using the investigation directives, whether a respective endpoint is subject to the malware attack detected by the honeypot. In some embodiments, the agents also apply mitigation and remediation measures to endpoints that are identified as infected.

In some embodiments, the honeypot and the agents do not communicate directly, but via a security management unit. The security management unit may, for example, select a partial subset of the agents to which the investigation directives should be distributed. In an example implementation, the attack is associated with a particular Operating System (OS), and the security management unit distributes the investigation directives only to agents having at least one endpoint that runs this OS.

An important feature of the disclosed techniques is the ability of the honeypot to automatically and reliably generate an "attack footprint"—A list of characteristics of the attack. Such a footprint may comprise, for example, characteristics such as processes installed as part of the attack, files uploaded, registry keys that have been added or modified, users that have been added, Command and Control (C&C) addresses or Uniform Resource Locators (URLs) used in the attack, and/or one or more "backdoors" created by the attacker. This set of characteristics, when identified reliably, is a powerful basis for investigation directives that enable the software agents to identify infected endpoints.

Another important feature of the disclosed techniques is the visibility the software agents have into the nodes and endpoints of the computer system. In some embodiments, e.g., in a virtualized data center, the computing system comprises multiple compute nodes. Each compute node runs a hypervisor that hosts Virtual Machines (VM). The agents are also hosted by the hypervisor, and therefore have direct visibility into the memory of the VMs, and are able to check for a match with the attack footprint using memory introspection.

Typically, the entire closed-loop process of detecting an attack on the honeypot, generating and distributing the investigation directives, and detecting infected endpoints by the agents, is performed in a fully automatic manner without any human involvement or mediation. Subsequent mitigation and remediation may also be invoked automatically. As such, attack detection, mitigation and remediation are fast and effective.

System Description

FIG. 1 is a block diagram that schematically illustrates a secure computer system 20, in accordance with an embodiment of the present invention. In the present example, system 20 comprises a cloud-based virtualized data center. The disclosed techniques, however, are in no way limited to virtualized environments, and can be applied in any suitable type of computer system.

In the example of FIG. 1, system 20 comprises multiple compute nodes 24, such as servers or workstations, interconnected by a communication network 26. The figure shows two compute nodes for simplicity, but real-life systems typically comprise a large number of compute nodes. Compute nodes 24 are referred to herein simply as nodes, for brevity.

Each node 24 comprises physical resources such as a Central Processing Unit (CPU) 28, a Network Interface Controller (NIC) 32, and memory and storage resources (not shown). A hypervisor 40 is configured to host, and allocate physical resources to, one or more Virtual Machines (VMs) 36 that in turn run various user applications. The VMs are also referred to herein as endpoints.

Each hypervisor 40 further runs a virtual switching fabric, referred to herein as a virtual switch 44. This fabric may comprise one or more interconnected virtual network switches and/or virtual bridges, via which VMs 36 of the node communicate with one another and with VMs or other entities external to the node.

In some embodiments, computer system 20 is protected from malware attacks by a security system that comprises a honeypot 48, a security management unit 60, and one or more software agents 46 associated with one or more of nodes 24. The security system identifies, and possibly mitigates and remediates various malware attacks on VMs 36 and on nodes 24 in general, using methods that are described in detail below.

Honeypot 48 is typically implemented as a compute node that is dedicated for malware attack detection. For example, the honeypot typically does not host any genuine users of system 20 and typically does not run any genuine user applications. The honeypot does appear as a genuine node, and does host users and run OSs and applications, for the purpose of luring attackers to launch attacks thereon. In a virtualized data center, for example, the honeypot may be configured to appear similar to one or more genuine VMs 36. In the present example, honeypot 48 comprises an interface 52 for communicating over network 26, and a processor 56 that carries out the various honeypot functions.

Security management unit 60 comprises an interface 64 for communicating over network 26, and a processor 68 that carries out the various security management functions. Each agent 46 typically comprises a software module running in or on top of hypervisor 40. In some embodiments, security management unit 60 communicates with a cloud management unit 72 having a VM information database 76. Cloud management unit 72 may comprise, for example, a vCenter server offered by VMware (Palo Alto, Calif.), an OpenStack controller, or any other suitable product.

The configuration of system 20 shown in FIG. 1 is an example configuration that is depicted purely for the sake of conceptual clarity. In alternative embodiments, any other suitable system configuration can be used.

For example, the figure shows a single honeypot 48 for the sake of clarity. In alternative embodiments, system 20 may comprise multiple honeypots. The honeypots may be installed (physically or logically) in different locations in system 20, and may be configured in different manners. In an example embodiment, multiple honeypots are physically collocated, but are logically located at different locations in the network topology of system 20.

As noted above, the techniques described herein are not limited to virtualized embodiments such as system 20 of FIG. 1. In alternative embodiments, the disclosed techniques can be implemented in a computing system that does not apply virtualization, and whose endpoints are physical machines. In such embodiments, agents 46 may be implemented as software modules that run in the various physical machines. Hybrid schemes, in which some endpoints are VMs and other endpoints are physical machines, can also be supported by the disclosed techniques.

As another example, in some embodiments honeypot 48 and agents 46 may communicate directly with one another, in which case security management unit 60 may be omitted or bypassed. As yet another example, the interaction between security management unit 60 and cloud management unit 72 is optional and in no way mandatory.

The different system elements shown in FIG. 1 may be implemented using any suitable hardware, such as using one or more Application-Specific Integrated Circuits (ASIC) or Field-Programmable Gate Arrays (FPGA). Alternatively, the various system elements can be implemented using software, or using a combination of hardware and software elements.

In some embodiments, agents 46, processor 56 and/or processor 68 may be implemented on one or more processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Automatic Detection, Mitigation and Remediation of Malware Attacks

In some embodiments, the security system of computer system 20 carries out a fast, fully-automatic, closed-loop process of attack detection, mitigation and remediation. In this process, honeypot 48 detects a malware attack and generates a list of attack characteristics, security management unit 60 issues, based on the attack characteristics, investigation directives to agents 46, and agents 46 verify whether any of the VMs on nodes 24 are infected with the attack.

Figure 2:
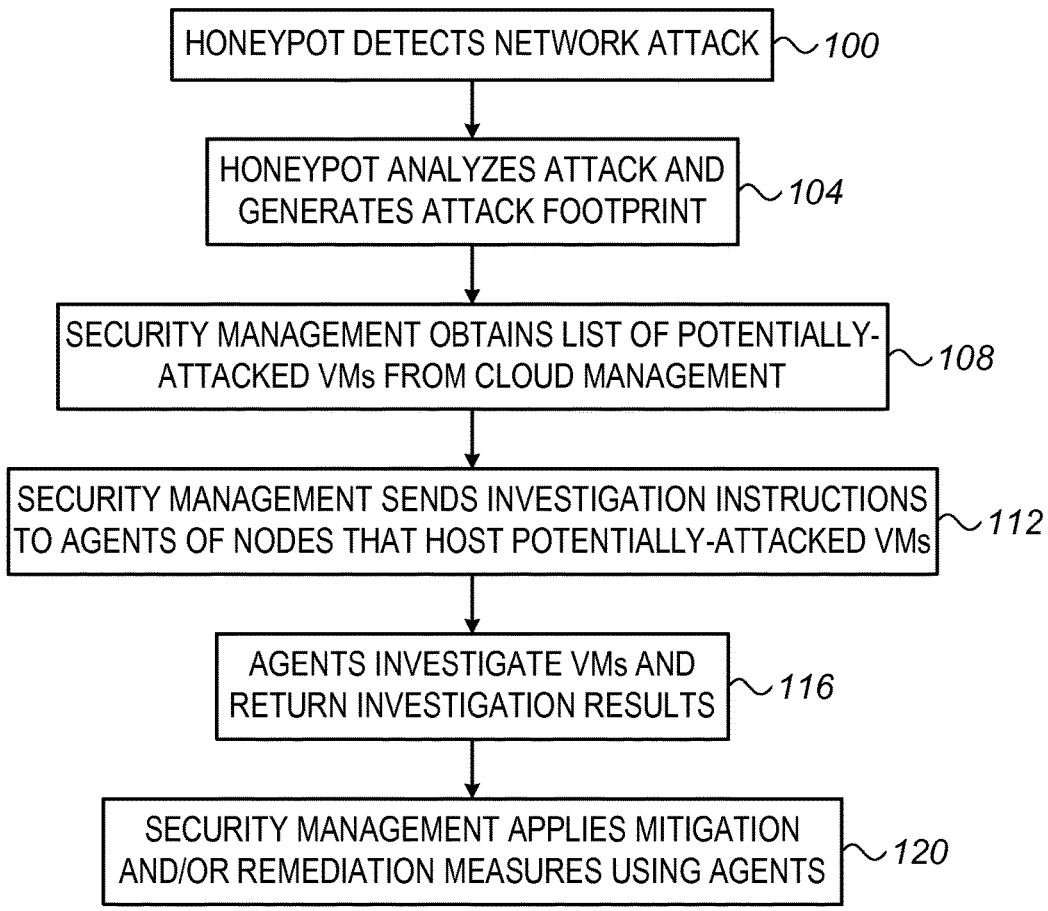
FIG. 2 is a flow chart that schematically illustrates a method for automatic detection and remediation of network attacks, in accordance with an embodiment of the present invention.

FIG. 2 is a flow chart that schematically illustrates a method for automatic detection and remediation of network attacks, in accordance with an embodiment of the present invention. The method begins with processor 56 of honeypot 48 detecting a malware attack on the honeypot, at an attack detection step 100.

Typically, processor 56 of honeypot 48 monitors events occurring in the honeypot and communication traffic exchanged with the honeypot, and/or other relevant information, and detects malware attacks on the honeypot. Malware attacks may comprise, for example, viruses, worms, Trojan horses or any other type of malicious software or activity.

Upon detecting an attack, processor 56 analyzes the suspicious activity and generates an "attack footprint" 80, at a footprint generation step 104. The attack footprint, also referred to as "malware footprint," comprises a list of attack characteristics as derived by processor 56. In an embodiment, attack footprint 80 comprises characteristics such as:

- One or more processes installed by the attacker on the honeypot as part of the attack.
- One or more files uploaded by the attacker to the honeypot as part of the attack.
- One or more registry keys that have been added or modified by the attacker on the honeypot as part of the attack.
- One or more users (user accounts) that have been added by the attacker on the honeypot as part of the attack.
- One or more Command and Control (C&C) addresses or Uniform Resource Locators (URLs) that have been accessed as part of the attack.
- One or more "backdoors" created as part of the attack for allowing the attacker subsequent re-entry.

In various embodiments, the attack footprint may comprise only a partial subset of the above characteristics, and/or one or more additional suitable characteristics.

Typically, processor 56 detects and characterizes the attack by distinguishing between legitimate and hostile accesses to the honeypot. For example, in some embodiments, processor 56 does not automatically adds to the attack footprint all the filed uploaded to the honeypot during the time period of the attack. Rather, processor 56 attempts to identify the files that are indeed related to the attack. For example, processor 56 may add to the attack footprint only files that were uploaded and then executed, and refrain from adding files that were merely uploaded.

The above list of characteristics, when identified with high reliability, is highly descriptive of the attack, e.g., of the tools and methods used by the attacker and/or the vulnerabilities being exploited. An underlying assumption is that if a given attack was detected in the honeypot, the same or similar attack is likely to be present in genuine endpoints.

The above-described attack footprint is thus highly effective in enabling agents 46 to identify infected nodes, with high detection probability, small false-detection probability, and no requirement for human involvement.

Honeypot 48 sends attack footprint 80 to security management unit 60 over network 26. Upon receiving the attack footprint, processor 68 of security management unit 60 decides which agents 46 should be notified of the attack.

In an embodiment, processor 68 selects the agents whose associated VMs run the OS version on which the attack is related, and refrains from notifying agents whose associated VMs do not run this OS. For example, if the attack identified by honeypot 48 is targeted specifically at the Windows OS, there is no need to notify agent 46 in a node 24 whose VMs run only Linux as a guest OS.

Processor 68 of security management unit 60 may select the agents to be notified in various ways. In the present example, processor 68 obtains a list 88 of potentially-attacked VMs 36 from cloud management unit 72, at a suspect list obtaining step 108. In this embodiment, processor 68 sends a VM-type query 84 to cloud management unit 72 over network 26. The query requests the cloud management unit to provide a list of VMs of a specified type, or a list of nodes 24 that host VMs of a specified type.

For example, the query may request the list of VMs having a particular guest OS (typically the same guest OS on which the attack was identified in the honeypot). Regardless of the specific format of list 88, the list comprises sufficient information for processor 68 to determine the identities of the nodes that host the suspect VMs on the list.

Cloud management unit 72 may construct suspect VM list 88, for example, by querying database 76. The cloud management unit sends the requested suspect list 88 to security management unit 60 over network 26.

At an investigation-instructions distribution step 112, processor 68 sends over network 26 investigation instructions 92 to each agent 46 having at least one VM that appears on suspect list 88. In an embodiment, processor 68 refrains from sending the investigation instructions to agents 46 having no VMs on suspect list 88. The investigation instructions are also referred to as investigation directives.

Typically, processor 68 derives the investigation directives from attack footprint 80 received from honeypot 48. In some embodiments, processor 68 sends the raw attack footprint as the investigation directives, without further processing. In other embodiments, processor 68 processes the footprint so as to produce the investigation directives.

In either case, the investigation directives are descriptive of the attack identified by honeypot 48, and comprise sufficient information that enables agents 46 to verify whether any of their associated VMs 36 have been infected by this attack.

In some embodiments, the investigation directives sent to a given agent 46 will also specify the identities of the suspect VMs that are hosted by the agent's node 24. Thus, different agents 46 may receive different directives relating to the same attack.

At an investigation step 116, each agent 46 that receives directives 92 investigates one or more of the VMs on its respective node 24 for possible infection. Typically, each agent 46 looks for a match between the attack characteristics in the attack footprint and events of data items found on its associated VMs.

For example, if the attack footprint specifies files, processes, user accounts, registry keys and/or C&C URLs that are indicative of the attack, agent 46 checks whether the specified files, processes, user accounts, registry keys and/or C&C URLs are present on its associated VMs. In some embodiments, a partial match is sufficient for agent 46 to conclude that a VM is likely to be infected.

In various embodiments, agents 46 may check their associated VMs 36 for infection in various ways. For example, in the virtualized data center example of FIG. 1, each agent 46 has direct visibility into the memories of VMs 36 that are hosted by the same hypervisor 40. Agent 46 may thus check for a match with the attack footprint by searching for the specified files, processes or other data in the VM memories.

Such a search may be performed, for example, using various memory introspection techniques. An example introspection tool that can be used for this purpose is LibVMI, supplied by the hypervisor vendor. Alternatively, however, any other suitable introspection tool can be used.

Agent 46 may use memory introspection, for example, to scan the VM memory for processes that match corresponding processes in the attack footprint. Another option is for agent 46 to search the VM file-system for files that match corresponding files in the attack footprint. In another example, agent 46 may map the virtual disks of suspect VMs (e.g., by accessing the physical disks of node 24) and look for files that match corresponding files reported in the attack footprint. Alternatively, agent 46 may search for any other suitable match with the attack footprint.

Additionally or alternatively, agent 46 may check for a match with the attack footprint by monitoring the communication traffic exchanged by the VMs 36 that are hosted by the same hypervisor 40. For example, agent 46 may be connected to virtual switch fabric 44 in the hypervisor, and configure the virtual switch fabric to forward or mirror traffic thereto. Such monitoring may be applied both intra-node traffic (between VMs of the same hypervisor) and/or to inter-node traffic (between different nodes 24).

Each agent 46 returns investigation results 96 to security management unit 60 over network 26. The investigation results may comprise, for example, a pass/fail notification that indicates whether a VM is infected or not. Other examples of information that may be sent as part of results 96 are the identities of VMs that are suspected of being infected, a severity measure for the infection, a confidence level in identifying the infection, and/or any other suitable information.

Security management unit 60 typically receives investigation results 96 from multiple agents 46 of multiple nodes 24. Upon receiving results indicating that a certain VM is infected, processor 68 of unit 60 may alert the administrator or take any other suitable action. The alert may indicate the identity of the infected VM that initiated the alert, identities of other VMs that are similarly infected, some or all of the attack characteristics, and/or any other suitable information.

Processor 68 of unit 60 may aggregate, analyze, store and/or present the investigation results in any suitable way. The investigation results collected from nodes 24 across system 20 provides a real-time, system-wide picture of the attack and its impact. This information can provide system administrators and analysts with valuable actionable data to act upon.

At a reaction step 120, security management unit 60 may act upon the investigation results in any suitable way. For example, unit 60 may apply mitigation measures that isolate (quarantine) infected VMs, or nodes 24 that host infected VMs, from network 26, so as to stop the attack from spreading. Additionally or alternatively, unit 60 may apply remediation measures that attempt to remove or otherwise neutralize the malware. Remediation may involve, for example, removing files, processes, registry keys and/or user accounts associated with the attack from infected VMs.

In some embodiments, some or all of the above responsive actions may be initiated autonomously by agents 46, without waiting for instructions from security management unit 60. For example, an agent 46 may be configured to quarantine infected VMs, or even the entire node 24, from network 26 upon identifying infection, and then wait for remediation instructions from security management unit 60. In some embodiments, mitigation and/or remediation measures are carried out by cloud management unit 72, in response to a trigger from unit 60.

The method flow of FIG. 2 described above is an example flow that is depicted purely for the sake of conceptual clarity. In alternative embodiments, any other suitable method flow can be used. For example, in some embodiments honeypot 48 may generate the investigation directives directly to agent 46, without going through security management unit 60. As another example, some of the attack characteristics in the attack footprint may originate from external sources, e.g., Internet services external to system 20, and not all necessarily from honeypot 48. In such embodiments, security management unit 60 merges the attack characteristics originating from various sources into a merged footprint, and/or into a coherent set of investigation directives.

As yet another example, in some embodiments, generation of the investigation directives is not assisted by cloud management unit 72. In such embodiments, all agents are notified of the attack and are provided with the attack footprint. Each agent identifies autonomously which of the VMs on its node 24 potentially match the attack footprint. For example, each agent 46 may check which of the VMs on its node have an OS type that matches the attack footprint. This identification, too, may be performed using VM memory introspection.

In still another example, agents 46 may be implemented as internal processes that run in VMs 36, e.g., one agent per VM. In this implementation, there is no need for memory introspection, and each agent may check for a match with the attack footprint by directly examining the VM it runs in.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for securing a computer system, the method comprising:
   detecting a malware attack on a honeypot node, and, based on the detected malware attack, automatically generating investigation directives for verifying whether endpoints of the computer system are subject to the malware attack,
   wherein automatically generating the investigation directives comprises automatically specifying at least one characteristic of the malware attack, selected from a group of characteristics consisting of:
  one or more processes installed on the honeypot node as part of the malware attack;
  one or more files uploaded to the honeypot node as part of the malware attack, including automatically specifying in the investigation directives only the files that were uploaded to the honeypot node and then executed;
  one or more registry added or modified on the honeypot node as part of the malware attack;
  one or more user accounts added on the honeypot as part of the malware attack;
  one or more Command and Control (C&C) addresses or Uniform Resource Locators (URLs) accessed during the malware attack; and
  one or more backdoors created as part of the malware attack;
distributing the investigation directives to one or more software agents that are each associated with one or more of the endpoints of the computer system; and
identifying, by the software agents using the investigation directives, at least one infected endpoint in the computer system that is subject to the malware attack.

2. The method according to claim 1, wherein detecting the malware attack comprises automatically generating one or more characteristics of the malware attack, by automatically distinguishing between legitimate accesses and hostile accesses to the honeypot node.

3. The method according to claim 1, wherein detecting the malware attack, generating and distributing the investigation directives, and identifying the infected node are performed without human involvement.

4. The method according to claim 1, wherein automatically generating the investigation directives comprises automatically specifying a type of endpoint that is targeted by the malware attack.

5. The method according to claim 4, wherein distributing the investigation directives comprises sending the investigation directives only to the software agents that are associated with at least one endpoint of the specified type.

6. The method according to claim 4, wherein distributing the investigation directives comprises notifying a given software agent of the endpoints that are associated with the given software agent and are of the specified type.

7. The method according to claim 4, wherein specifying the type of endpoint comprises specifying an Operating System (OS) type targeted by the malware attack.

8. The method according to claim 1, wherein one or more of the endpoints comprise Virtual Machines (VMs), and wherein identifying the infected endpoint comprises examining a memory of one or more of the VMs using memory introspection.

9. The method according to claim 1, and comprising, in response to identifying the infected endpoint, automatically quarantining the infected endpoint or a node of the computing system that hosts the infected endpoint.

10. The method according to claim 1, and comprising, in response to identifying the infected endpoint, automatically remediating the infected endpoint.

11. Apparatus for securing a computer system, the apparatus comprising:
  a honeypot node, which is configured to detect a malware attack thereon and to initiate, based on the detected malware attack, automatic generation of investigation directives for verifying whether endpoints of the computer system are subject to the malware attack, wherein the honeypot node is configured to initiate generation of the investigation directives, by automatically specifying at least one characteristic of the malware attack, selected from a group of characteristics consisting of:
    one or more processes installed on the honeypot node as part of the malware attack;
    one or more files uploaded to the honeypot node as part of the malware attack, including automatic specification in the investigation directives only the files that were uploaded to the honeypot node and then executed;
    one or more registry added or modified on the honeypot node as part of the malware attack;
    one or more user accounts added on the honeypot as part of the malware attack;
    one or more Command and Control (C&C) addresses or Uniform Resource Locators (URLs) accessed during the malware attack; and
    one or more backdoors created as part of the malware attack; and
  one or more software agents, which are each associated with one or more of the endpoints of the computer system and configured to receive the investigation directives, and to identify, using the investigation directives, at least one infected endpoint in the computer system that is subject to the malware attack.

12. The apparatus according to claim 11, wherein the honeypot node is configured to automatically generate one or more characteristics of the malware attack, by automatically distinguishing between legitimate accesses and hostile accesses to the honeypot node.

13. The apparatus according to claim 11, wherein the honeypot node and the software agents are configured to detect the malware attack, generate and distribute the investigation directives and identify the infected node without human involvement.

14. The apparatus according to claim 11, wherein the honeypot node is configured to automatically specify a type of endpoint that is targeted by the malware attack.

15. The apparatus according to claim 14, and comprising a security management unit that is configured to distribute the investigation directives only to the software agents that are associated with at least one endpoint of the specified type.

16. The apparatus according to claim 14, and comprising a security management unit that is configured to notify a given software agent of the endpoints that are associated with the given software agent and are of the specified type.

17. The apparatus according to claim 14, wherein the honeypot node is configured to automatically specify the type of endpoint by an Operating System (OS) type targeted by the malware attack.

18. The apparatus according to claim 11, wherein one or more of the endpoints comprise Virtual Machines (VMs), and wherein the software agents are configured to identify the infected endpoint by examining a memory of one or more of the VMs using memory introspection.

19. The apparatus according to claim 11, and comprising a security management unit that is configured, in response to identifying the infected endpoint, to automatically quarantine the infected endpoint or a node of the computing system that hosts the infected endpoint.

20. The apparatus according to claim 11, and comprising a security management unit that is configured, in response to identifying the infected endpoint, to automatically remediate the infected endpoint.

* * * * *